H. J. PERKINS.
GRINDING MACHINE.
APPLICATION FILED SEPT. 1, 1916.

1,311,992.

Patented Aug. 5, 1919.
17 SHEETS—SHEET 5.

WITNESSES:

INVENTOR.
Harry J. Perkins
BY Moulton & Lirrance
ATTORNEYS.

H. J. PERKINS.
GRINDING MACHINE.
APPLICATION FILED SEPT. 1, 1916.
1,311,992.
Patented Aug. 5, 1919.
17 SHEETS—SHEET 6.
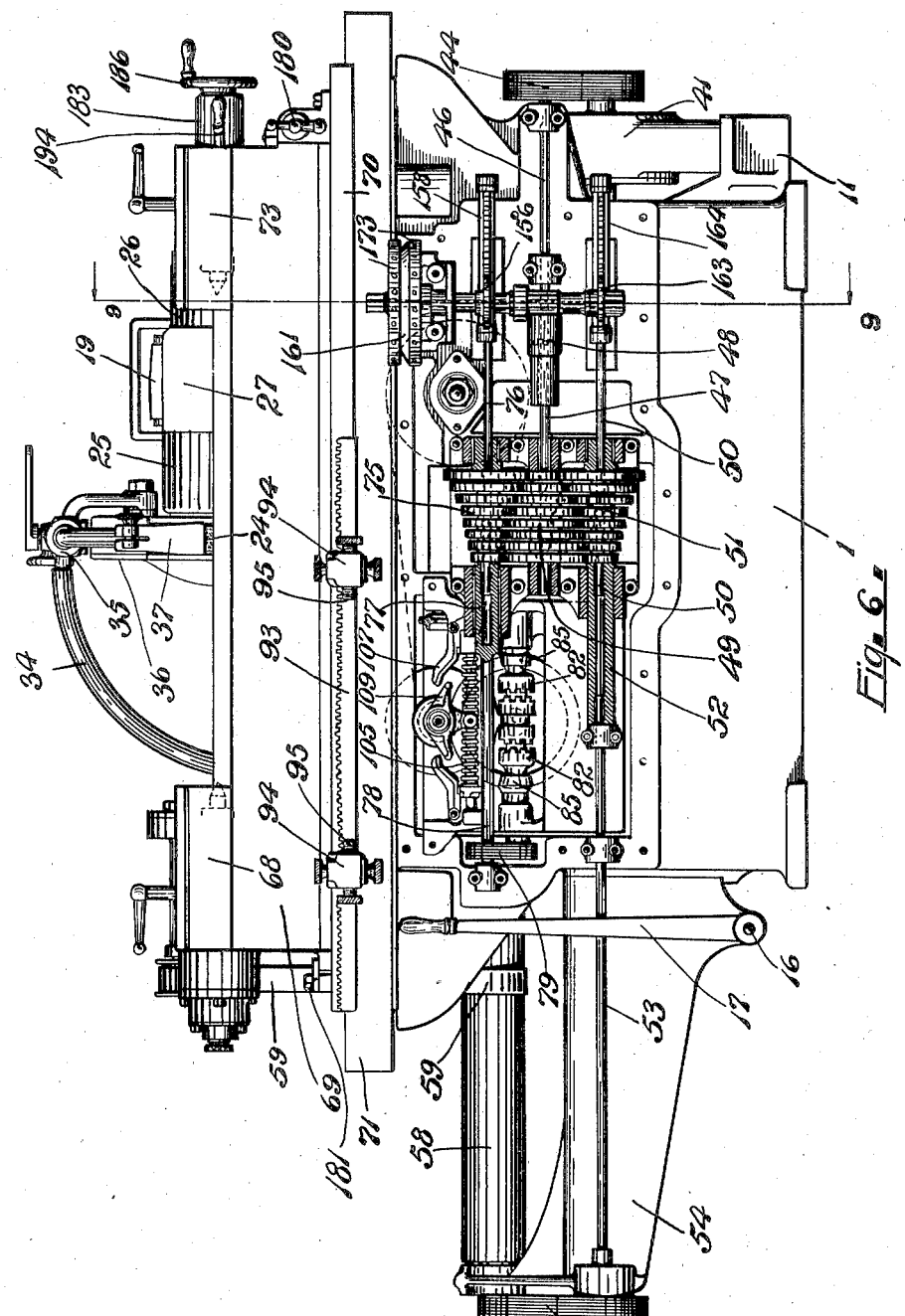
WITNESSES:
a. J. Koon.
A. H. Yarrington
INVENTOR.
Harry J. Perkins
BY Moulton & Liviance
ATTORNEYS.

H. J. PERKINS.
GRINDING MACHINE.
APPLICATION FILED SEPT. 1, 1916.
1,311,992.
Patented Aug. 5, 1919.
17 SHEETS—SHEET 7.
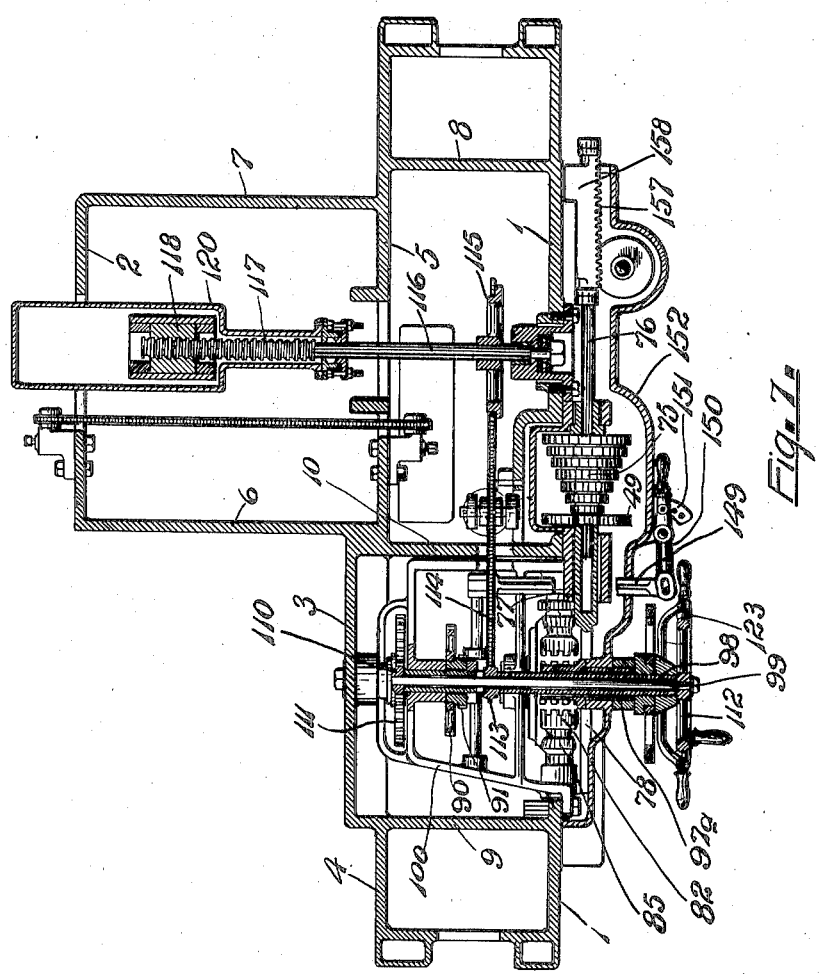
WITNESSES:
a. J. Koon
H. H. Yarrington
INVENTOR.
Harry J. Perkins
BY Moulton & Lirrance
ATTORNEYS.

H. J. PERKINS.
GRINDING MACHINE.
APPLICATION FILED SEPT. 1, 1916.
1,311,992.
Patented Aug. 5, 1919.
17 SHEETS—SHEET 8.
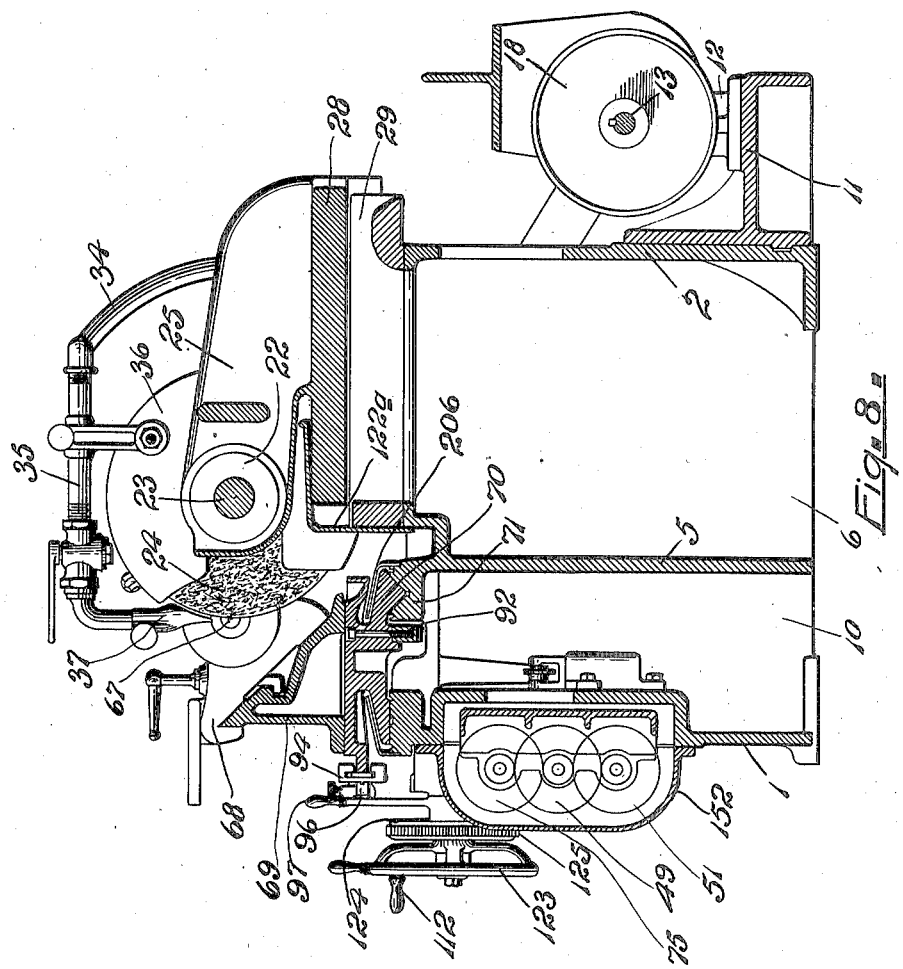
WITNESSES:
A. J. Koon.
H. J. Yarrington.
INVENTOR.
Harry J. Perkins.
BY Moulton & Liuraure
ATTORNEYS.

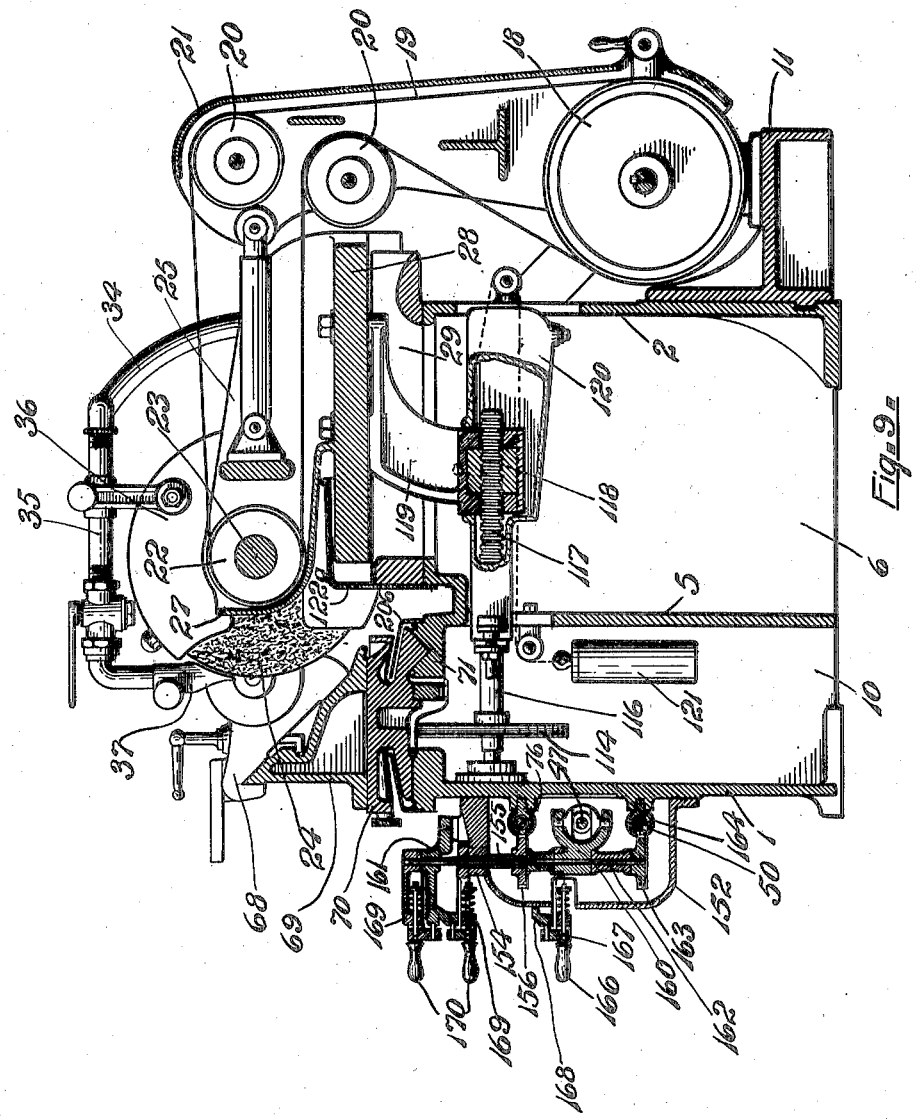

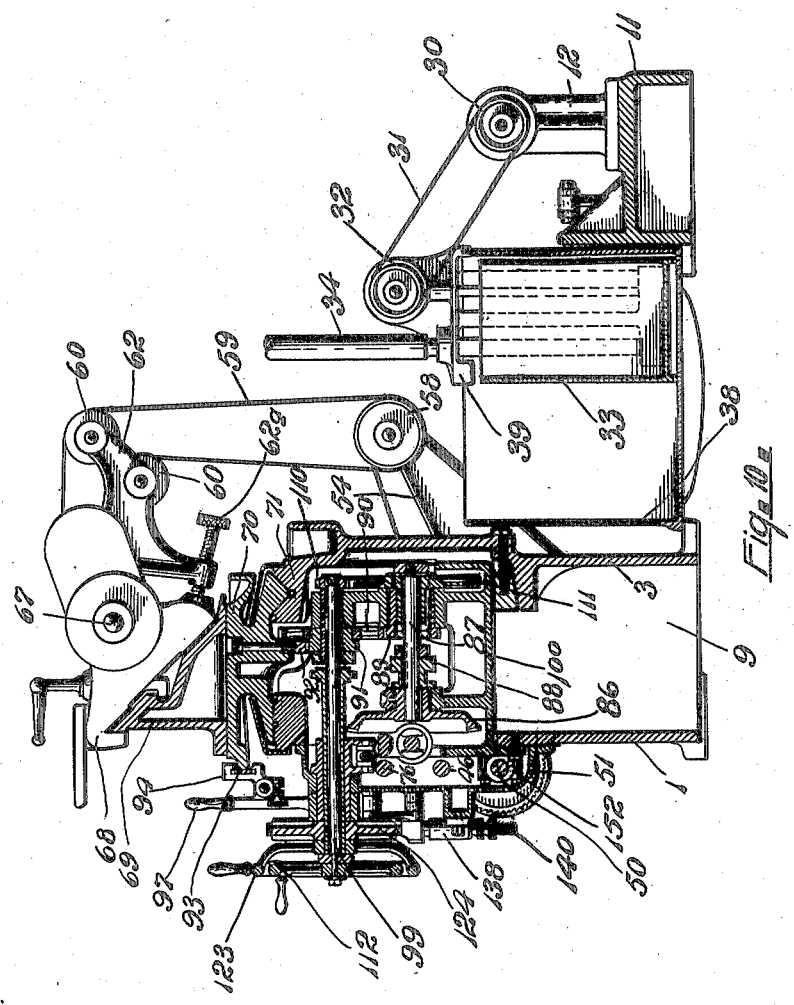

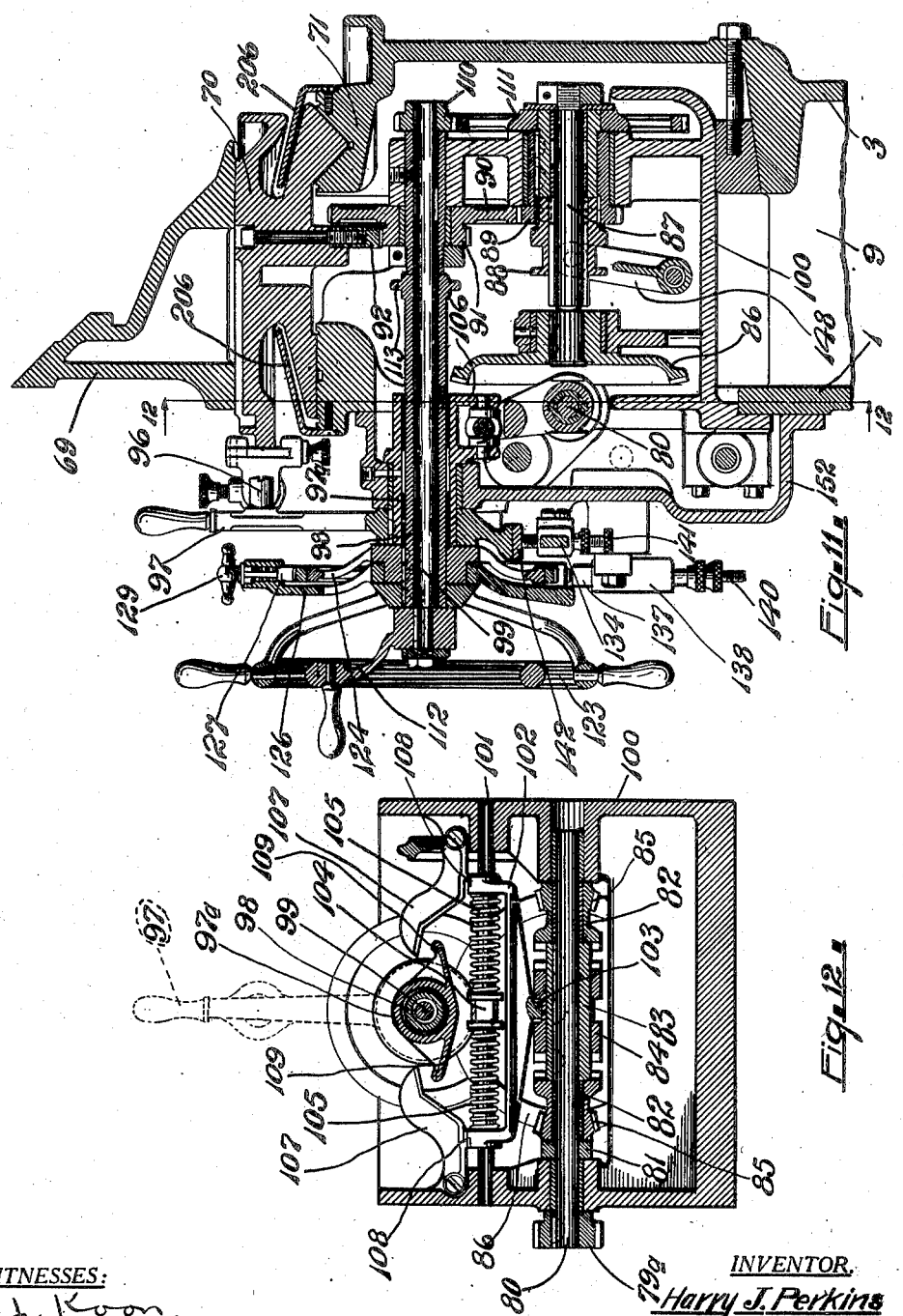

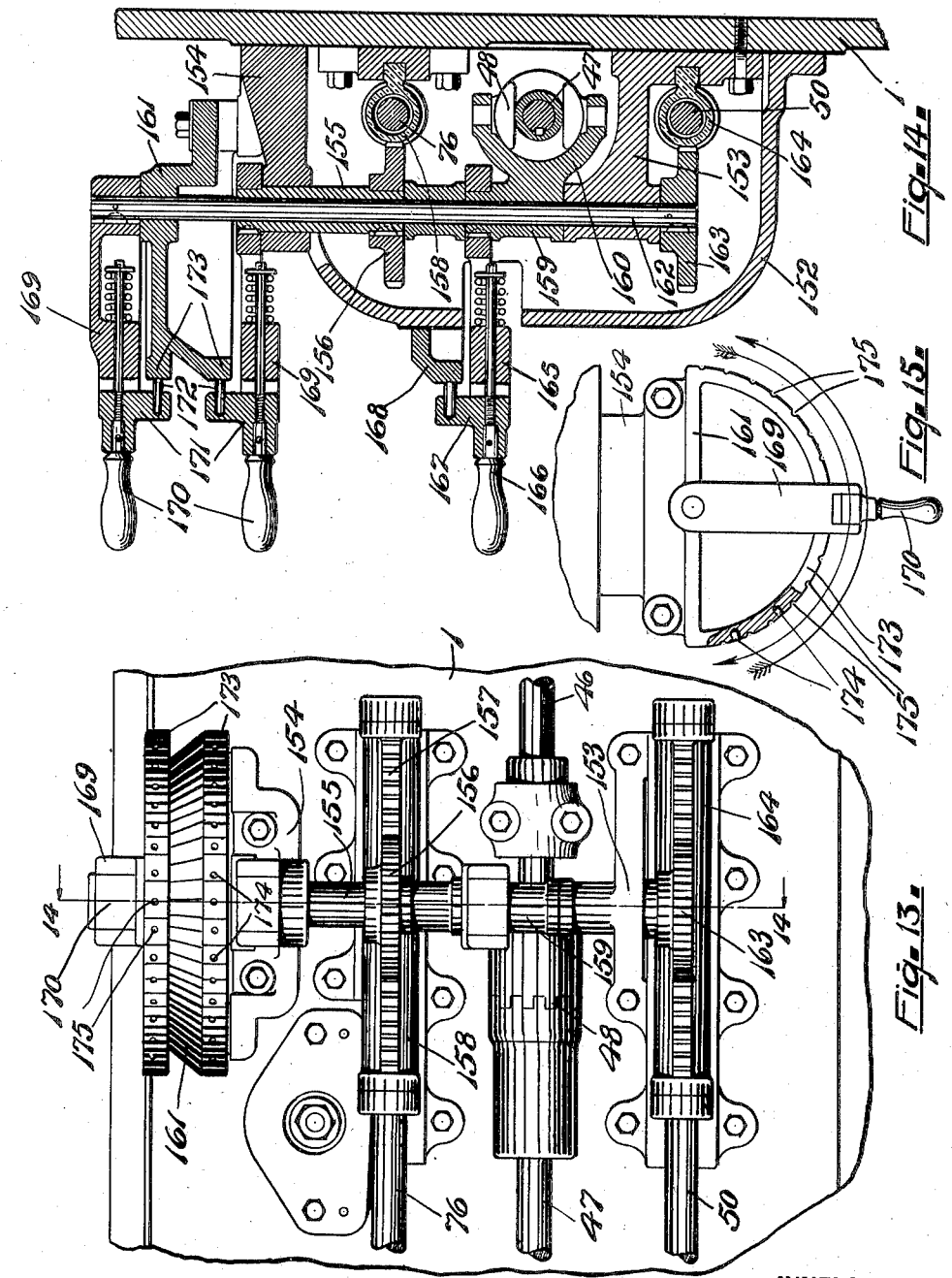

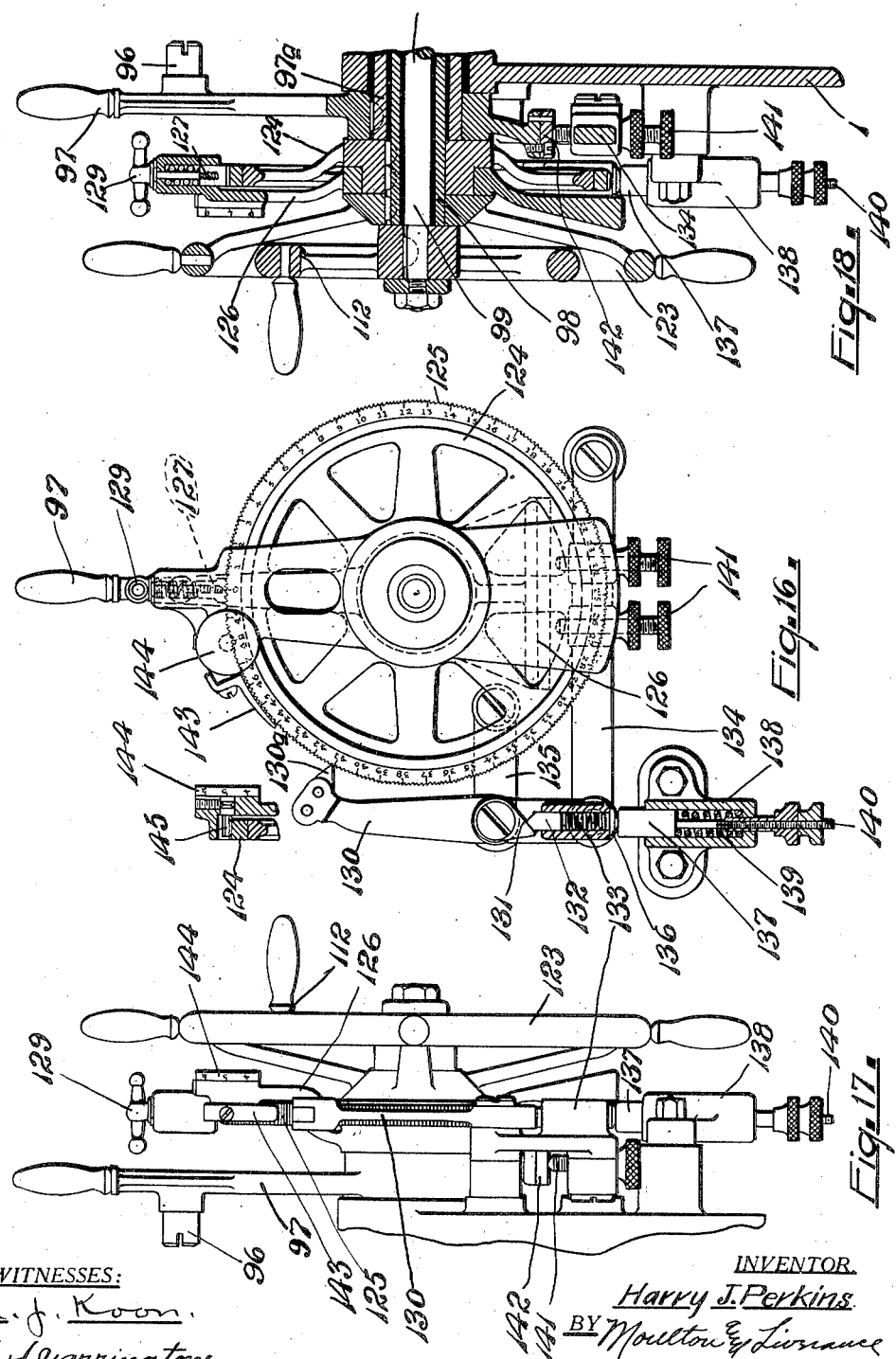

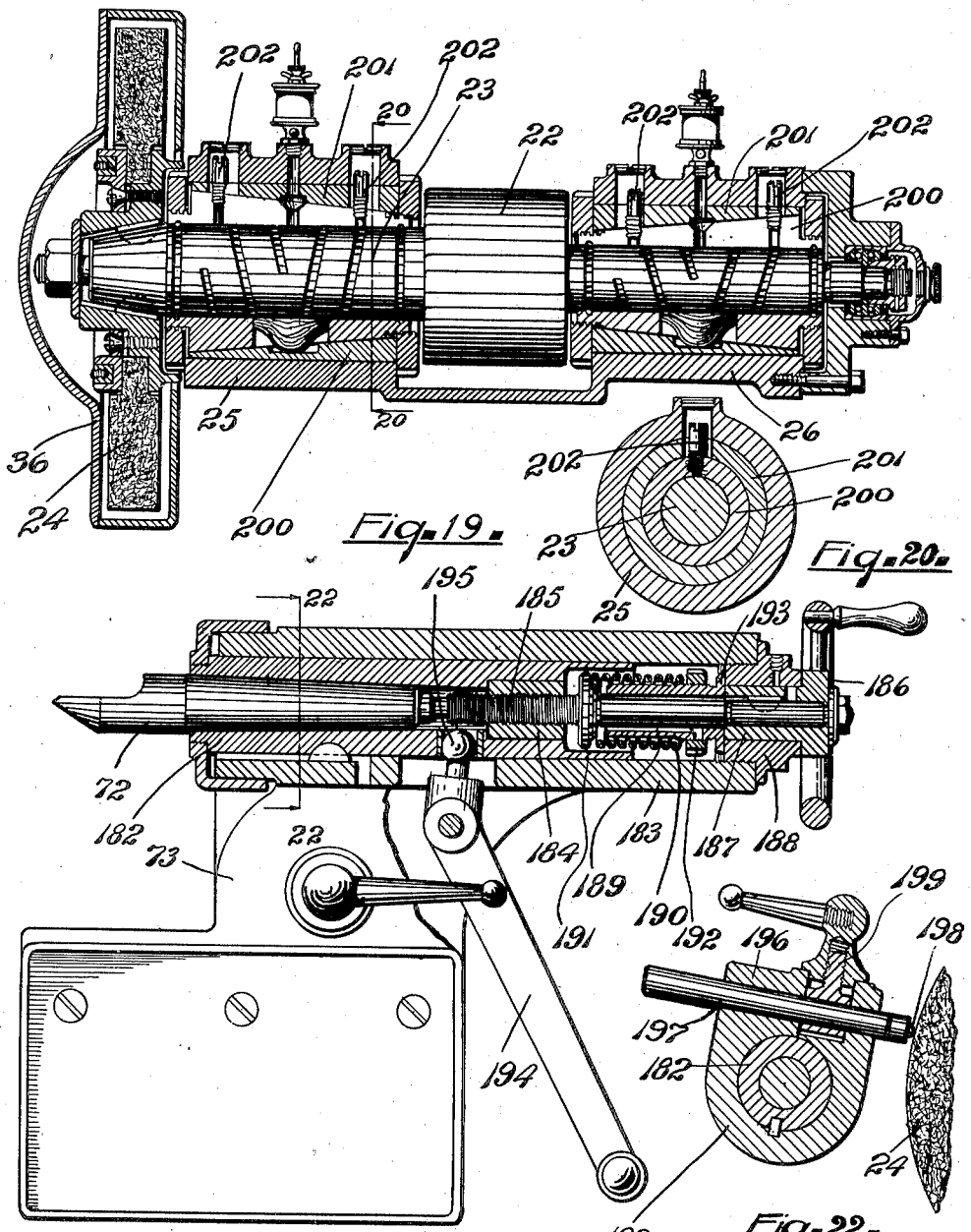

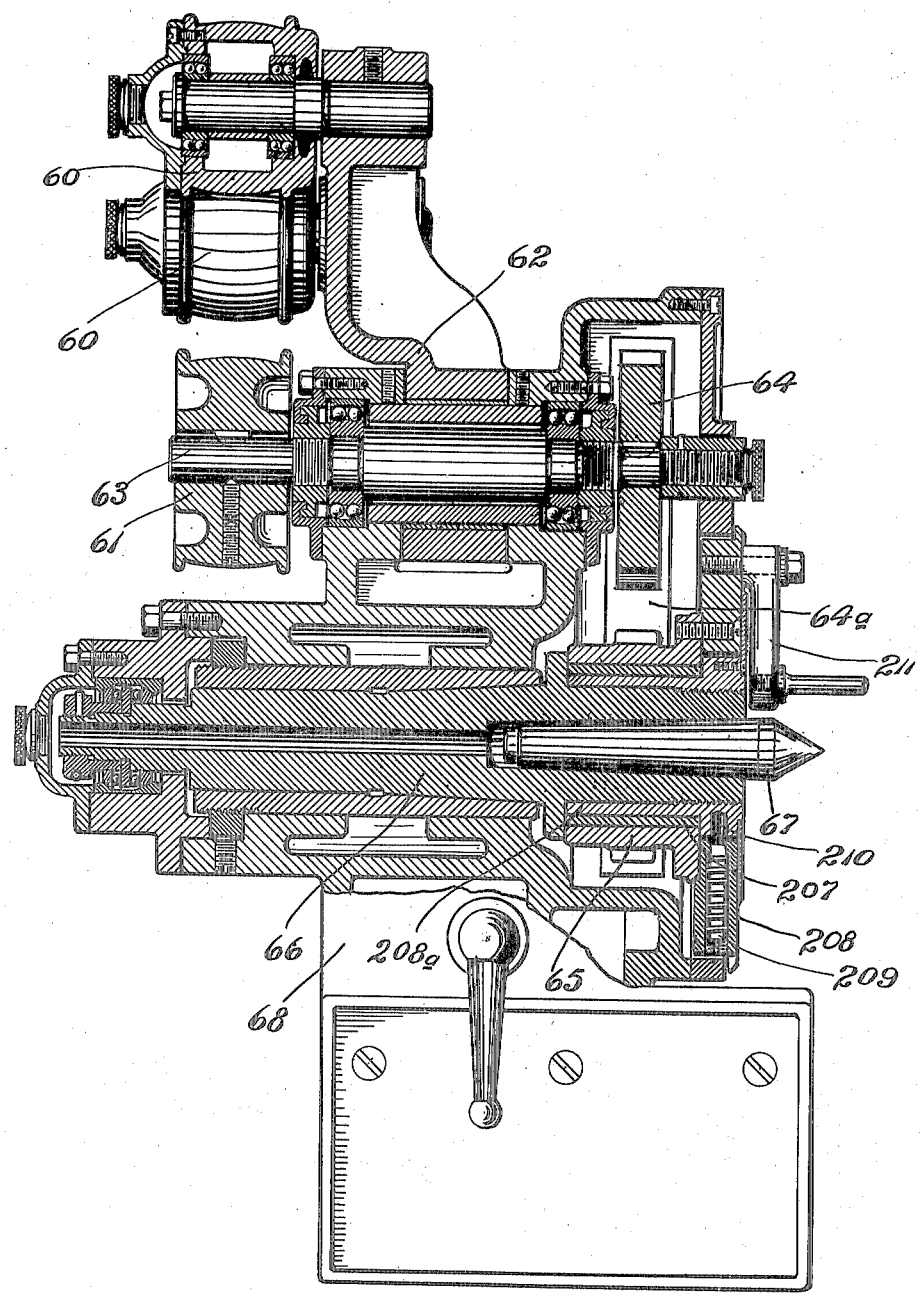

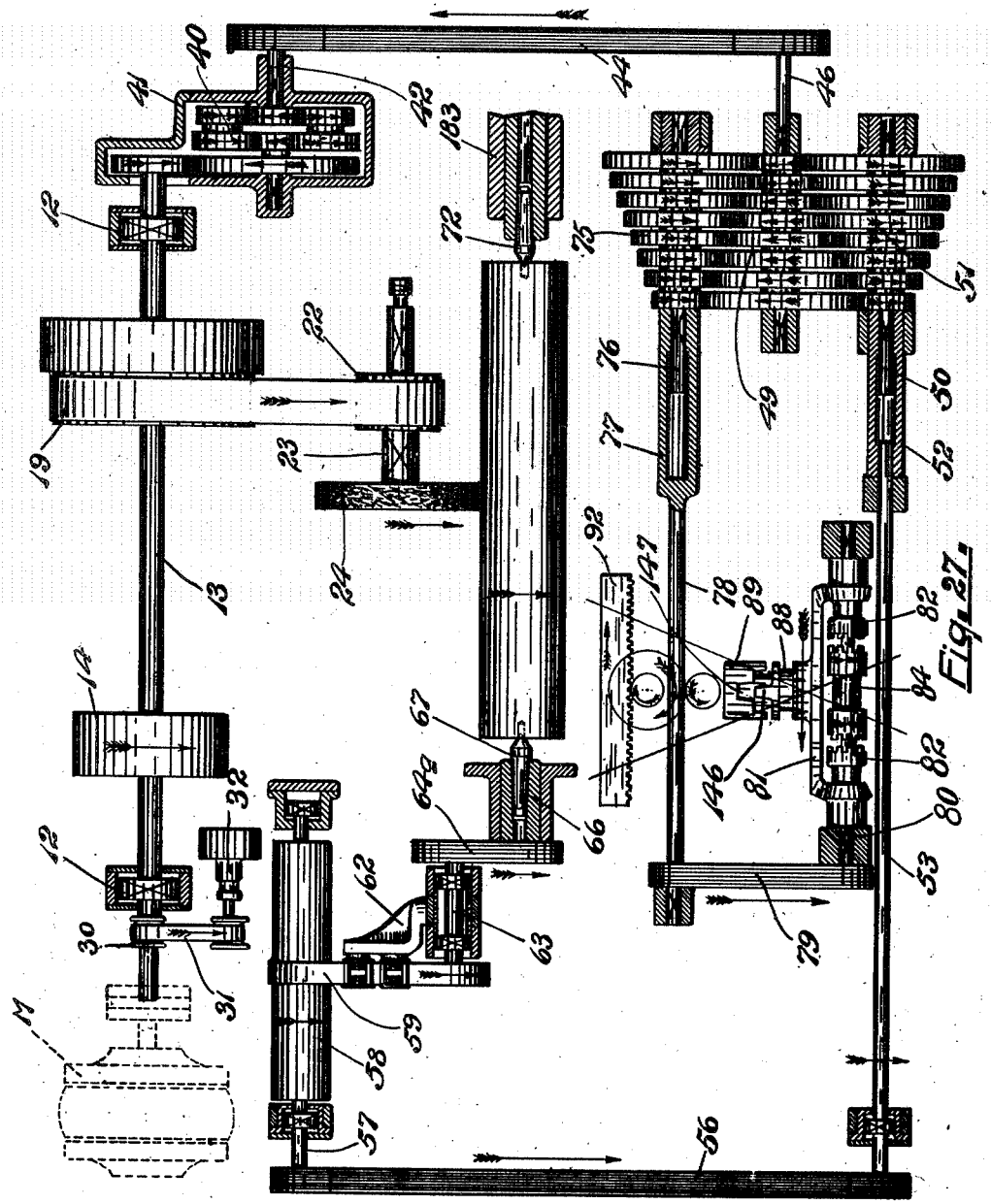

UNITED STATES PATENT OFFICE.

HARRY J. PERKINS, OF GRAND RAPIDS, MICHIGAN.

GRINDING-MACHINE.

1,311,992.　　　　Specification of Letters Patent.　　Patented Aug. 5, 1919.

Application filed September 1, 1916. Serial No. 118,019.

*To all whom it may concern:*

Be it known that I, HARRY J. PERKINS, a citizen of the United States of America, residing at Grand Rapids, in the county of Kent and State of Michigan, have invented certain new and useful Improvements in Grinding-Machines; and I do hereby declare the following to be a full, clear, and exact description of the invention, such as will enable others skilled in the art to which it appertains to make and use the same.

This invention relates to grinding machines for use in grinding straight cylindrical work and taper work with a maximum degree of accuracy and to a minute measure of accuracy. It is an object and purpose of the present invention to provide a grinding machine with many novel features of construction and operation whereby the work holding table may be driven at a large number of speeds from the main driving mechanism of the machine and at the same time the work operated upon by the grinding wheel may also be rotated at a large number of speeds both the table and the work being operated from the same master gearing. A further object of the invention resides in a novel construction for controlling the operation of the gearing which drives the work and the work table, together with a control for disconnecting the power entirely from the machine, all of such control mechanism being located at the front of the machine and in easily accessible position for operation, said control being capable of operation for instantly stopping either the whole machine or the work holding table or the mechanism driving the work. A still further object of the invention is the provision of a centralized control for determining the feed of the grinding wheel, together with novel mechanism for controlling such feed either manually or automatically with the operation of the machine. Many other objects and purposes not specifically enumerated will appear as the description of the machine embodying my invention progresses, reference being had to the accompanying drawings in which, Figure 1 is a front elevation of the machine.

Fig. 6 is a front elevation with parts removed to show interior mechanism of the machine.

Fig. 7 is a section taken horizontally through the machine on the line 7—7 of Fig. 1.

Fig. 8 is a vertical section on line 8—8, Fig. 5.

Fig. 9 is a vertical section on line 9—9, Fig. 6.

Fig. 10 is a vertical section on line 10—10, Fig. 1.

Fig. 11 is an enlarged section taken vertically through the front portion of the machine substantially on the line 11—11, Fig. 5.

Fig. 12 is a vertical section on the line 12—12, Fig. 11.

Fig. 13 is a front elevation of the control for operating the gearing connections for driving the work and the work table.

Fig. 14 is a vertical section taken on the line 14—14, Fig. 13.

Fig. 15 is a plan of a fragment of the control mechanism shown in Figs. 13 and 14.

Fig. 16 is a front elevation enlarged of the control mechanism for governing the cross feed of the grinding wheel.

Fig. 17 is a side elevation thereof.

Fig. 18 is a vertical section taken centrally through such control mechanism.

Fig. 19 is a vertical section on the line 19—19, Fig. 3.

Fig. 20 is a transverse section on line 20—20, Fig. 19.

Fig. 21 is a horizontal section on the line 21—21, Fig. 1.

Fig. 22 is a transverse section on line 22—22, Fig. 21.

Fig. 23 is a horizontal section on line 23—23, Fig. 2.

Fig. 27 is a plan showing diagrammatically the layout of the principal elements of the machine and their operative relation to each other.

The sectional views are all shown as looking in the direction indicated by the arrows, and in the several views of the drawings, like reference characters refer to like parts.

Figure 1:
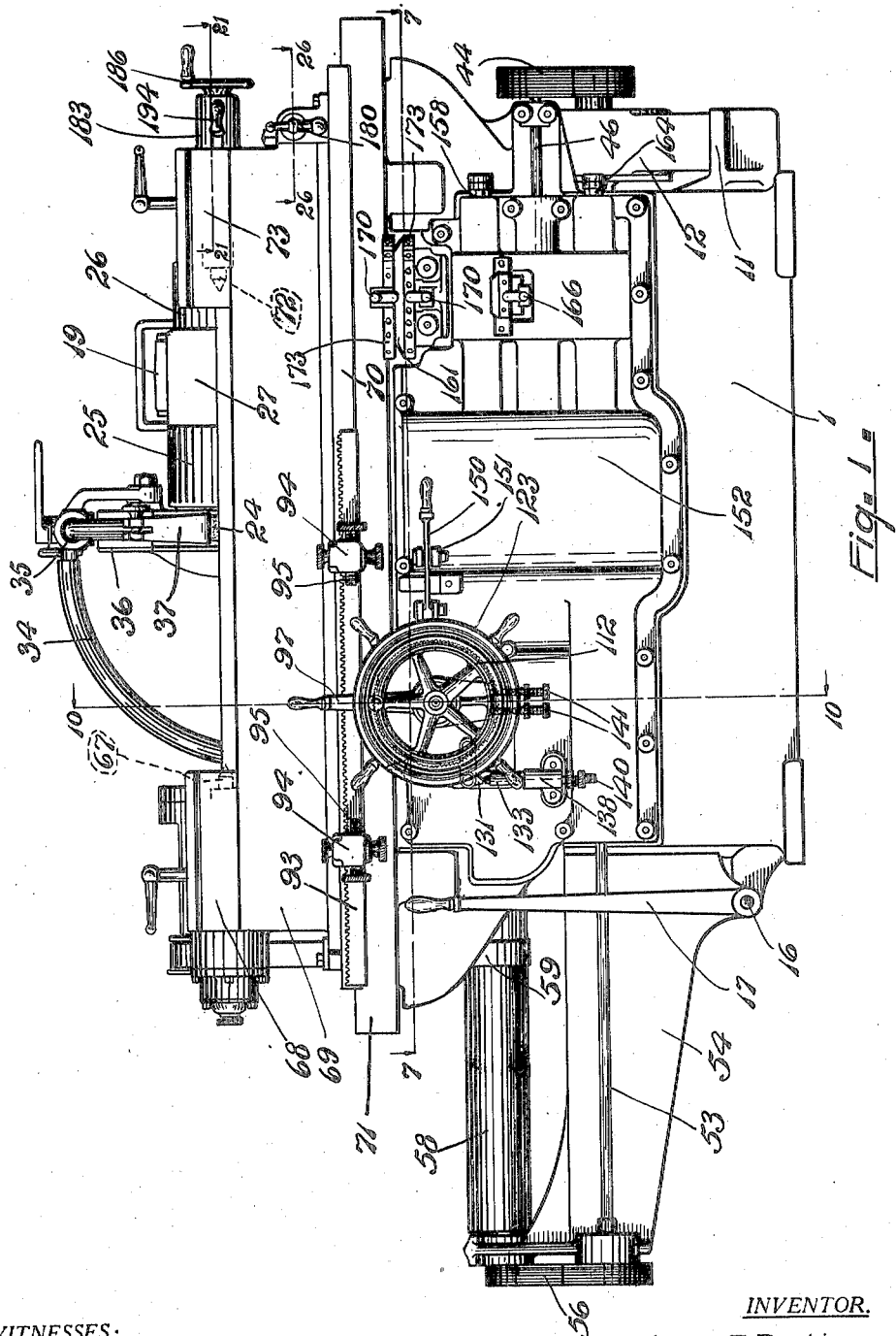
Figure 2:
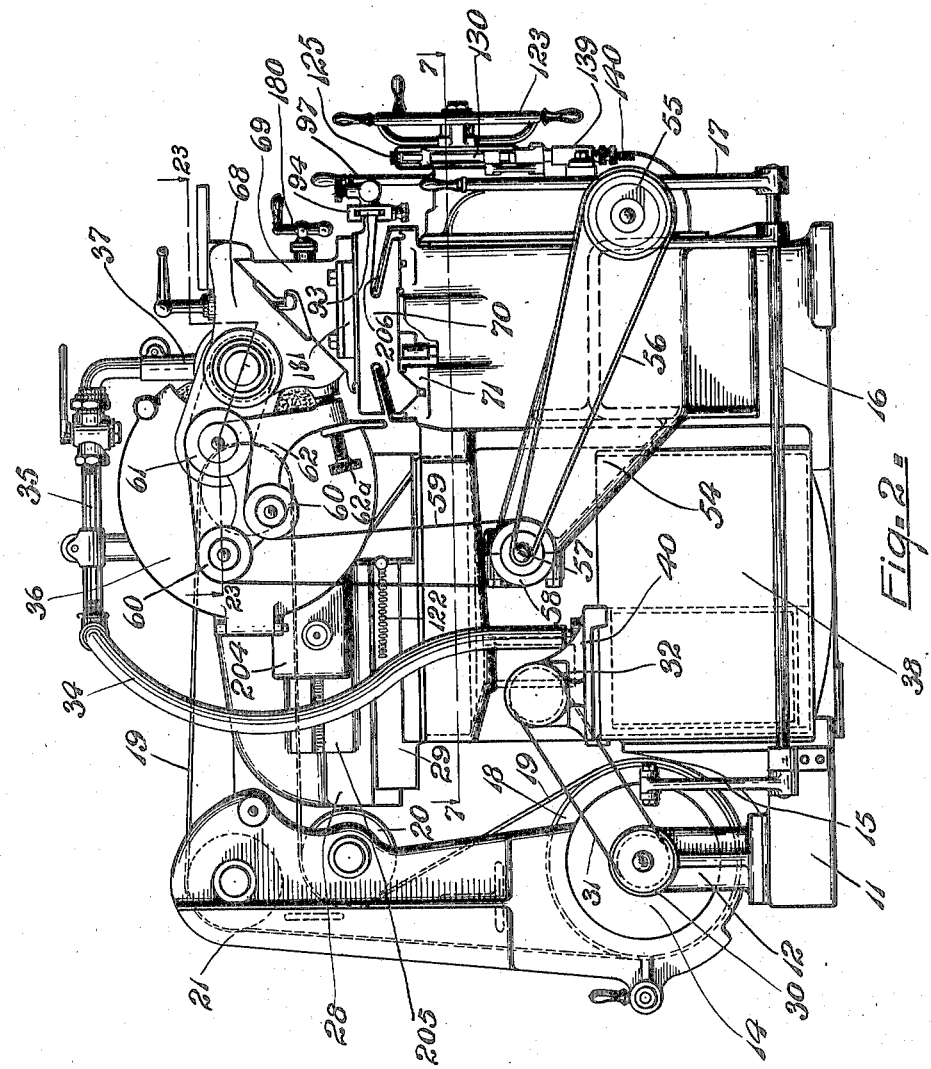
Fig. 2 is an end elevation thereof.
Figure 3:
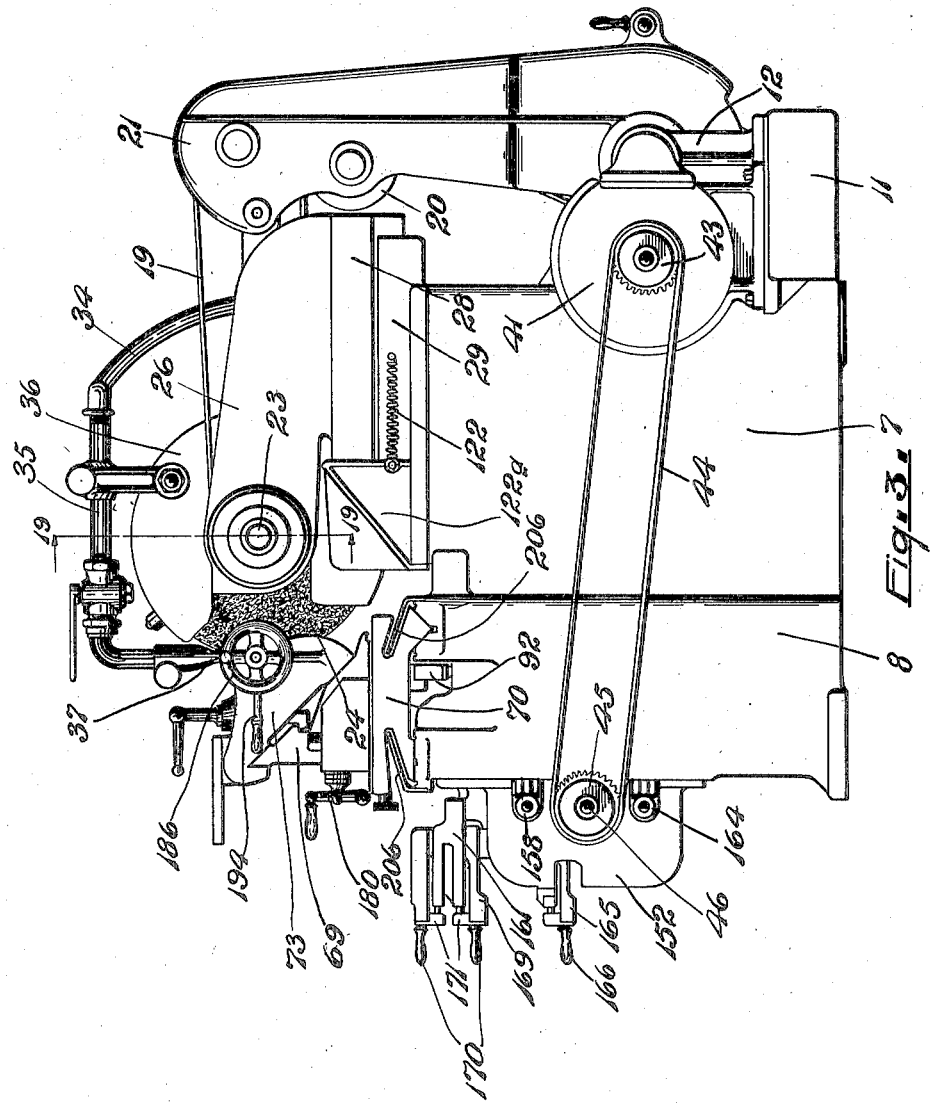
Fig. 3 is an end elevation from the opposite end of the machine.
Figure 4:
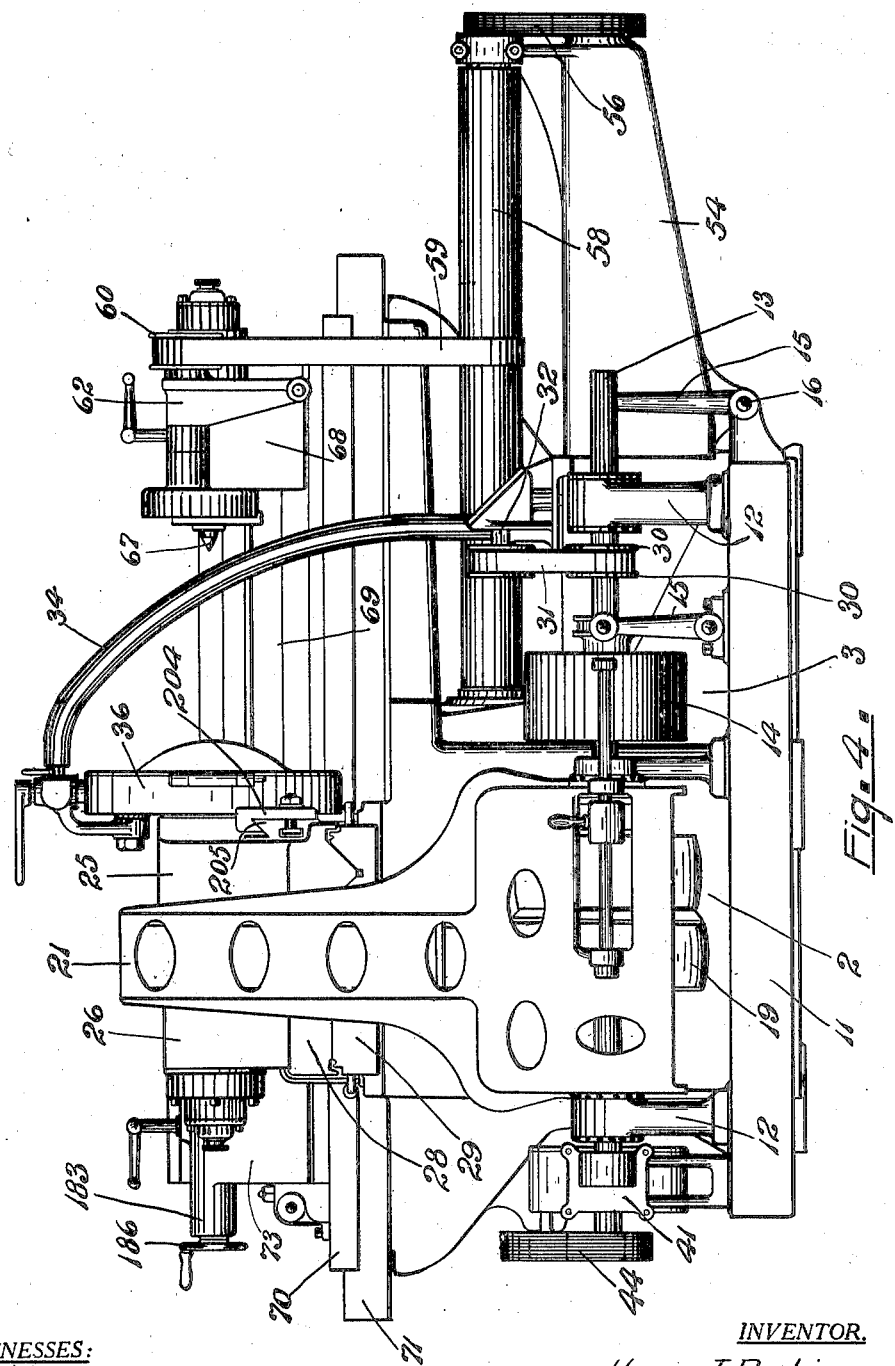
Fig. 4 is a rear elevation.
Figure 5:
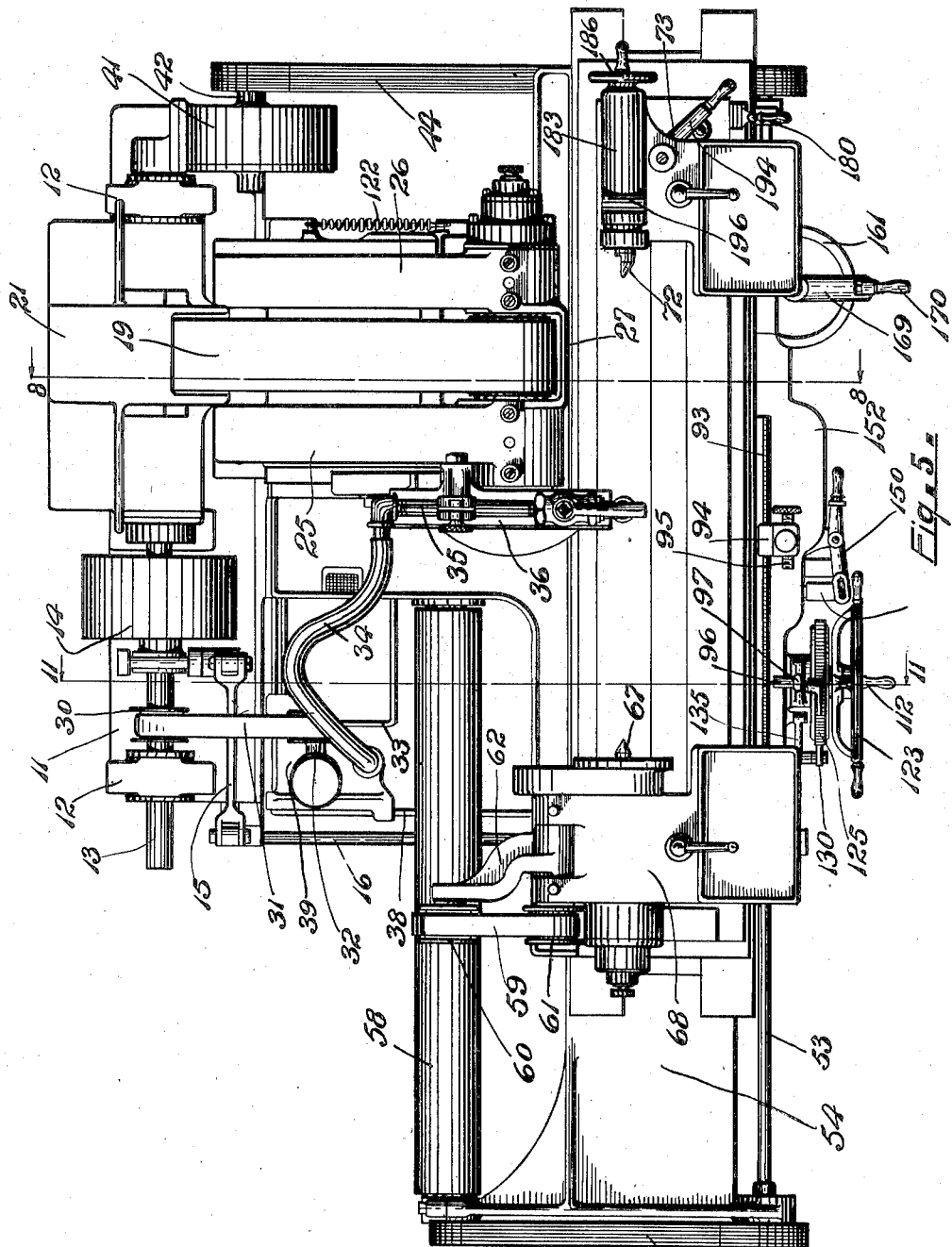
Fig. 5 is a plan of the entire machine.
Figures 24, 25:
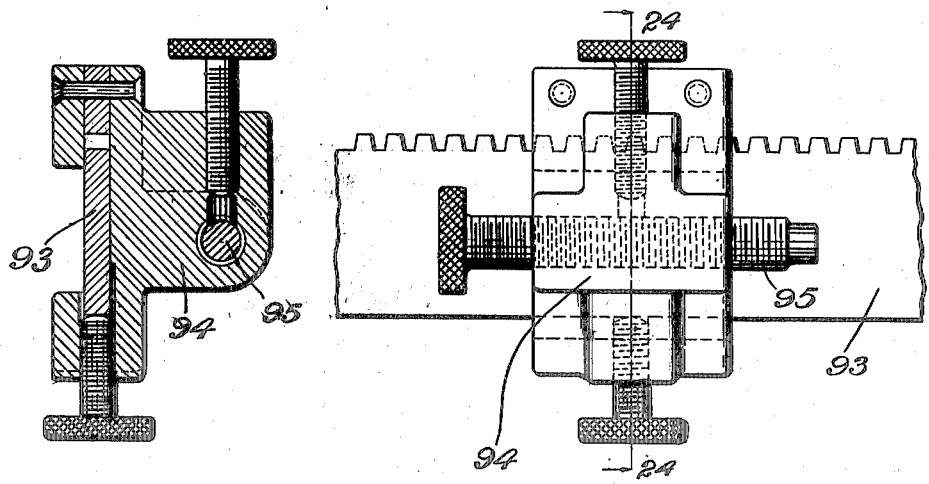
Fig. 24 is a transverse section on line 24—24, Fig. 25.
Fig. 25 is a front elevation enlarged of a reversing stop and a fragment of the mounting bar therefor.
Figure 26:
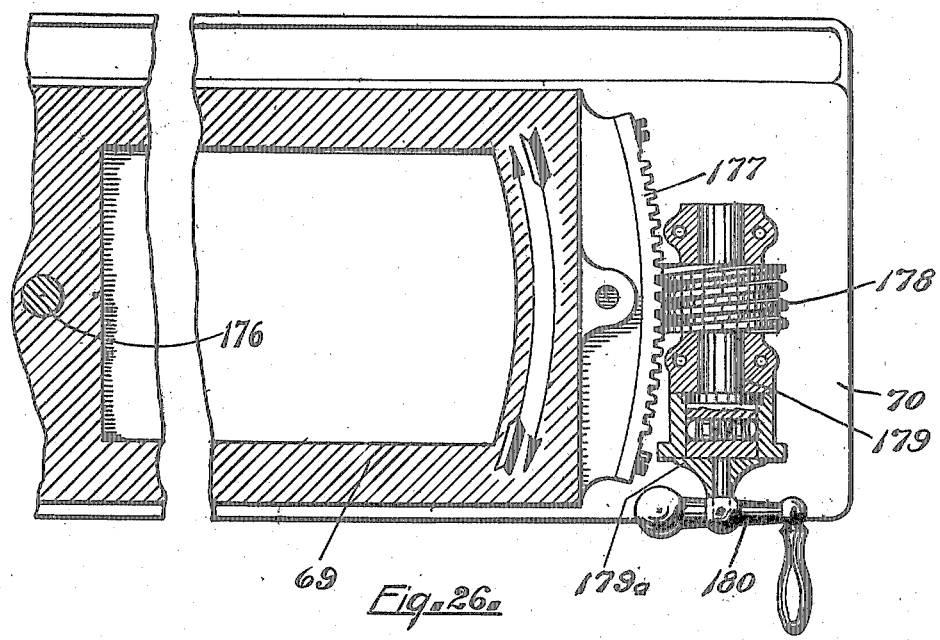
Fig. 26 is a section on line 26, Fig. 1.

The supporting frame for the machine is of cast iron, preferably, and in the form of a hollow casting having a front wall 1, a rear wall 2 of less length than the front wall, there being interposed between the walls 1 and 2 a series of intermediate walls 3, 4 and 5 which together equal in length the length of the front wall. Transverse walls 6 and 7 connect the ends of wall 2 with the intermediate wall 5 and transverse walls 8, 9 and 10 connect the front wall 1 with the intermediate walls 3 and 4 serving as ends to the casting and to strengthen the same between its ends.

Back of the support just described is positioned a base 11 lying the full length of the support and serving to support the brackets 12 adjacent its ends. Bearings are formed at the upper ends of the brackets in which is mounted a shaft 13 which is adapted to be driven from any suitable source of power or by an electric motor indicated at M, Fig. 27. When driven from a line shaft or engine, the belt passes around drive pulley 14 loose on the shaft 13 but adapted to be fixed thereon through any suitable clutch mechanism operated by links 15 and rods 16 which at its forward end carries an operating lever 17 accessible at the front of the machine within reach of the operator. A pulley is fixed on shaft 13 as shown at 18 and serves to drive a belt 19 which passes over idle pulleys 20 supported a distance above the drive pulley 18 by the combined guard and support 21, the direction of the belt being changed thereby so that it lies horizontal, leading around a driven pulley 22 on a shaft 23, to the end of which is secured the grinding wheel 24. Shaft 23 is mounted in bearings at the ends of two forwardly extending arms 25 and 26. A guard 27 covers the front of the pulley 22 and is interposed between said arms extending to the rear under the pulley and being attached together with said arms to a carriage 28 slidably mounted to move back and forth transversely of the machine on guides 29 cast integral with the main supporting casting. The grinding wheel having direct connection with the drive shaft is driven at a very rapid rate of speed.

A pulley 30 is also secured to the drive shaft 13 serving to drive belt 31 which operates a pump 32 for taking water from a tank 33 and forcing it through a flexible conduit 34 to a pipe 35 supported by a bracket attached to the guard 36 for the grinding wheel. From the end of the pipe 36 a nozzle 37 extends downwardly in front of the grinding wheel whereby water is delivered directly to the wheel. The tank 33 is carried in a receptacle 38 at one corner of which the base 39 of the pump is attached, and at any time, the tank may be removed for cleaning if necessary.

At one end of the shaft 13 is positioned a series of gears 40 housed in a casing 41 for reducing the speed with which shaft 42 is driven. Said shaft is mounted in bearings in said housing and at its end carries pulley 43 around which is placed a link belt 44, said belt extending forward and driving a wheel or pulley 45 fixed on the end of shaft 46, said shaft being rotatably supported in suitable bearings on the front of the front wall 1. In alinement with shaft 46 is a shaft 47 and a clutch 48 is interposed between the shafts serving in one position of the clutch parts to connect them together. Shaft 47 is also suitably supported in bearings attached to the front wall 1 and has secured thereto a series of gears 49 progressively increasing in size from one end to the other. Directly under shaft 47 is positioned a parallel shaft 50 suitably supported in a manner similar to the support of shaft 47, and having loosely positioned thereon a series of gears 51 also progressively increasing in size but in a direction opposed to the increase of size of the gears on shaft 47. Said gears 49 and 51 are continually in engagement with each other, and by operation of a suitable key any one of the gears 51 may be connected to so as to drive shaft 50, this being a well known type of change speed gearing. Shaft 50 enters one end of a sleeve 52 which serves to couple it with a shaft 53 which extends a distance beyond the end of the main supporting casting and is supported by a bracket 54 attached to and extending from the main support. A pulley 55 on the end of shaft 53 drives a link belt 56 passed around a small pulley on the end of shaft 57 also supported by the bracket 54 and connected with a roller 58 which is located horizontally and supported at its inner end by a suitable bearing in the supporting frame of the machine. A belt 59 is driven by the roller 58, it passing upwardly and then to the front over two idle pulleys 60 and a driven pulley 61 mounted on a bracket 62 which is pivotally supported on the shaft 63 to the end of which pulley 61 is fixed. Shaft 63 is mounted on the head stock bracket 68 and at its opposite end has a wheel 64 secured thereto which through a link belt 64ª drives a wheel 65 fixed to a sleeve 66 rotatably mounted in said bracket 68, the end of the sleeve receiving the head stock center 67 as best shown in Fig. 23.

The head stock is detachably clamped to one end of a member 69 positioned lengthwise of the table 70. Said table is positioned lengthwise of the casting support in front of and below the grinding wheel being mounted for sliding movements lengthwise of the machine in guides 71. The work to be acted upon by the grinding wheel is supported between the head stock center 67 and the tailstock center 72 in the usual manner. The tailstock is also detachably and adjustably clamped to the member 69 permitting the movement thereof along the length of said member for different lengths of work.

Meshing also with the series of gears 49 is a series of gears 75 loose on a shaft 76 but adapted to be connected one at a time thereto in the usual manner with change is a series of gears 75 loose on a shaft 76 is coupled with a sleeve 77 integral with which is formed a shaft 78 mounted for rotation in front of the front wall 1. A pulley on the end of the shaft drives a link belt 79 which in turn drives a shaft 80, a driven pulley 79ª being secured at the end of the shaft to receive belt 79. On shaft 80 is loosely mounted the forwardly extending arms of a yoke 81 and against each arm a clutch member 82 bears, said clutch member being spaced apart and loosely mounted on shaft 80. The clutch members 82 are held apart by a sleeve 83 fixed on shaft 80 and splined to said sleeve between the clutch members 82 is a two-faced clutch member 84 adapted to engage with either of the clutch members 82. Each clutch member 82 has also formed integral therewith a bevel gear 85 both of said gears being in mesh with a large bevel gear 86 located back of the shaft 80 and fixed at the forward end of a shaft 87 which is mounted transversely of the length of the machine and has splined thereon a clutch member 88 adapted to engage with a companion clutch member 89 loosely mounted on shaft 87 and formed with a gear meshing with a large gear 90 rotatably mounted directly above the shaft 87. The gear 90 carries at its forward face a smaller gear 91 which engages with a rack 92 fixed to and lengthwise of the table 70 heretofore described. It is of course apparent that whenever gear 91 is rotating, the carriage or table 70 is movable lengthwise of the machine carrying the work in front of the grinding wheel. And such movement of the table is possible only when the central clutch member 84 is engaged with one of the clutch members 82, engagement with different members 82 driving the table in opposite directions.

Secured to the front of the table 70 is a bar 93 on which two spaced apart stops 94 are adjustably mounted, each carrying an adjustable screw 95 for fineness in adjustment. The stops may be locked on bar 93 and the screws 95 on their respective stops 94 by set screws as shown. In the movement of the table 70 lengthwise of the machine, the end of a screw 95 is brought into contact engagement with the projection 96 on the rear of lever 97 keyed to a sleeve 97ª rotatively mounted on a sleeve 98 which in turn is rotatively mounted on a shaft 99 positioned horizontally and transversely of the machine. Said shaft, together with shaft 87, shaft 80 and associated mechanism is carried at its rear end in suitable bearings formed on a supporting frame 100 inserted through the front wall 1 of the machine as best shown in Fig. 11. Directly above shaft 80 parallel thereto and supported similarly by the frame 100 is a shaft 101 carrying a loosely mounted yoke 102 from which projects a finger 103 entering a groove in the clutch member 84. A sleeve 104 is loosely mounted on rod 101 midway between the arms of yoke 102, there being interposed a coiled spring 105 between said sleeve and each arm of the yoke. Depending fingers 106 from the sleeve 97ª engage with the sleeve 104 and serve to move it along rod 101 on rotation of the sleeve 97ª. Directly above the ends of rod 101 are pivotally mounted the levers 107, each on its under side having a shoulder 108 adapted to drop behind the end of the adjacent arm of yoke 102 in certain positions of movement of the yoke. Sleeve 97ª also is provided with oppositely extending members 109 the ends of which are located under the ends of levers 107. When a screw 95 engages against projection 96 and turns lever 97, the first effect is to move sleeve 104 to one side, compressing spring 105 and storing energy such that on completion of the movement and engagement of member 109 under lever 107, thereby releasing the spring, the intermediate clutch member 84 is disengaged from one of the clutch members 82 and carried over into engagement with the other, the movement of the table 70 being reversed. By reason of the series of gears 75 driven by the master gears 49, a large number of speeds for the movement of the table 70 may be attained as well as a large number of speeds for the driving of the work, and any one of these speeds for the table may be used in conjunction with any one of the speeds for the work, making a great variety of combinations adapted to take care of practically every class of work.

A pinion 110 secured to the rear end of shaft 99 drives a gear 111 connected with the combined clutch and gear 89. A hand wheel 112 is keyed to the forward end of the shaft and by operation of the hand wheel, the table may be moved manually to any desired position so as to locate the work with respect to the grinding wheel, for instance at the start of any operation on the work.

A sprocket wheel or like device is formed at the rear end of the sleeve 98 as indicated at 113 driving an endless chain 114 passed around it and a larger wheel 115 secured on the transverse shaft 116 mounted for rotation between the front and rear walls 1 and 2, said shaft terminating short of the rear wall and having its rear end threaded at 117 and screwed into a block 118 carried at the lower end of a bracket 119 which is bolted to and depends from the carriage 28 previously described. The lower end of bracket 119 is inserted into a hollow housing 120, at its front end having a bearing adapted to rotatively and slidably support the shaft 116. In practice a counter weight 121 is used the tendency of which is to impel the housing and associated parts forward. A hand wheel 123 keyed to the front end of sleeve 98 is of use in manually positioning the grinding wheel at any desired position and for feeding the wheel either toward or away from the work.

Immediately to the rear of hand wheel 124 and also keyed to sleeve 98 is a wheel 124, the outer surface of which is divided into a plurality of notches, preferably four hundred in number. A member 126 is loosely mounted to rotate about the axis of shaft 99 as a center and at its upper end is formed with an overhanging shroud 128 in which is mounted a member 127 notched at its lower end to engage with the notches 125. A spring normally forces said member into engagement with the wheel 124 but by operating the member 129, the handle of which is located above the shroud and the threaded lower end of which threads into member 127, the member may be disengaged from the notched wheel. A lever 130 carrying a dog 130$^a$ engaging with the notched wheel is formed at its opposite end with an inclined face 131 against which the upper end of a plug 132 bears, said plug being mounted in a sleeve 133 carried at the end of the pivotally mounted bar 134 and impelled by spring pressure against the lever. It will be noted that the upper end of plug 132 has diagonal faces at an angle to each other and if desired, lever 130 may be turned so as to disengage from notched wheel 124 and held in such position, the lever 130 is pivotally mounted at the end of a bar 135, both of bars 134 and 135 being pivotally connected to the front wall 1 of the machine. The lower end of sleeve 133 is closed by a cap 136 against which a plunger 137 slidably mounted in a sleeve 138 bears, said sleeve being fastened to the front wall 1 and housing a spring 139 under pressure. A rod depends from the plunger through the base of the sleeve and is threaded at its lower end to receive adjusting and locking nuts as indicated at 141 whereby the position of the dog 130$^a$ on the notched wheel 124 may be adjusted as desired. A pair of screws 141 are threaded through the bar 134 and may be locked in position thereon, the upper ends of the screws coming below a hardened bar 142 secured on an extension to the lever 97 below the pivotal mount therefor. A plate 143 is attached to the shroud 128, it being curved to conform to the outer surface of the notched wheel and there is also rotatively mounted on the shroud an indicating handle or wheel 144, the shaft 145 thereof extending through and being formed with teeth to engage with the notched wheel whereby on rotation of the wheel the indicating characters on the wheel 144 will denote the amount of feed given to the grinding wheel toward the work.

The mechanism just described is an automatic cross feed for the grinding wheel operated by the movements of the lever 97 as it is actuated in the process of reversing the traverse of the work holding table. The inclination of lever 97 from the vertical brings plate 142 against a screw 141 depressing bar 134 and lowering lever 130 and attached dog 130$^a$, the dog rotating the wheel 124 a limited distance and advancing the grinding wheel correspondingly toward the work. By adjustment of the screws 141 and of the plunger 137 the amount of the depression of said bar and the corresponding feed of the grinding wheel may be regulated as is evident. Upon return of lever 97 to the vertical, spring 139 which has been compressed causes the return of lever 130 and the attached dog to their original position. With each reciprocatory movement, accordingly, the feed of the grinding wheel takes place advancing automatically toward the work. During this automatic feed, member 127 may be disengaged from wheel 124 and the feed of the grinding wheel toward the work continue indefinitely or until the work approaches the required size. When this occurs, the work is measured, and the amount yet to be removed determined, whereupon the member 126 is moved so that the member 143 is spaced from the dog 130$^a$ the required number of notches such that when fed forward the work will be completed, the member 127 engaged with wheel 124 and the machine again started in motion. The automatic feed then continues until member 143 is moved toward the dog 130$^a$ and raises it away from the wheel 124, the feed thereupon being stopped with the work in finished condition.

In the reversal of the movement of the work holding table it is desirable that between each succeeding reciprocation of the table there shall be a short period of rest for the table while the grinding wheel and the work operated upon continue in motion. This is accomplished by making the dog 146 (see Fig. 27) on the clutch 88 of narrower width than the recess 147 on the companion clutch member 89, and for the larger cylinders ground by the machine, the outer portion of said recess is much wider than the dog or projection 146 whereby in passing across this space, the table will momentarily remain at rest sufficient to completely grind the cylinder at the end. The clutch member 88 is engaged by a link 148 operatively associated with which is a bar 149 leading forward to the front of the machine and connected to the lever 150 which is adapted to be operated to three positions, that is with the projection 146 within the narrower portion of the recess 147, with the projection within the wider portion of the recess and entirely disengaged from the recess whereupon the table remains at rest while the remainder of the machine is operating. Lever 150 and the bracket 151 for holding it in any one of the three positions are mounted on a cover or housing plate 152 which is bolted to the front wall 1 covering the operating mechanism from view except such parts as are necessary to accomplish the manual control thereof.

It will be noted that the control of the machine so far as described is centralized at the front thereof. The control for the gearing for changing the speed of the work and the travel of the table is also located at the front of the machine all within easy reach of the operator. Secured to the front wall 1 are lower and upper brackets 153 and 154 in the upper of which is rotatively mounted a vertical sleeve 155 having fixed at its lower end a gear 156 meshing with a rack 157 cut in one side of a tube or sleeve 158 secured to the shaft 76 heretofore described. Below this gear 156 and suitably spaced therefrom is a second sleeve 159 integral with which is a yoke 160 connected with the movable clutch member of the clutch 48 heretofore described. A head 161 is connected to the upper bracket 154 through which, together with the sleeve 155, sleeve 159 and bracket 153 a vertical rod or shaft 162 passes and in which it is rotatively mounted, a gear 163 being fastened to the lower end of said shaft and engaging with a rack cut in the side of a tube 164 secured to the shaft 50. Sleeves 158 and 164 are suitably supported for sliding movement along the face of the front wall 1. An operating member 165 is fastened to sleeve 159 projecting through the housing 152 and having an operating handle 166 slidably mounted thereon including a part 167 provided with a pin which is adapted to engage with any one of a plurality of notches or depressions in the face of the member 168 secured to and in front of housing 152. The handle 166 and the pin associated therewith are drawn forward by the spring as shown whereby the handle is retained in any position to which it may be adjusted, it being clear that by suitable operation thereof, the clutch 48 may be engaged or disengaged to drive the master gearing 49 or permit it to remain at rest while the drive shaft, pump and grinding wheel are in motion. Similarly at the upper ends of sleeve 155 and shaft 162 an operating member 169 is fixed similarly provided with an operating handle 170 including a part 171 having a pin 172 spring operated against the flanges 173 formed at the front of member 161, said pins being adapted to seat in the depressions 174 and 175 formed in the faces of the flanges. When seated in a depression 174, it is designed that a gear of the series 51 or 75 will be keyed to shaft 50 or 76 and that when in either of the depressions 175 at either side of a depression 174, the key shall be in neutral, all of the gears of a series such as that shown at 51 or 75 being free to run loosely. Accordingly the operator may at any time stop all of the mechanism driven by shaft 46, or he may stop either or both parts of the mechanism driven through shafts 50 and 76 at will, the control therefor being within easy reach of the operator at the front of the machine.

The member on which the head and tail stocks are mounted is pivotally mounted on the pin 176 at a point substantially between its ends to turn with respect to the table 70. At one end, a segment of a worm gear is connected to the member 69, engaging with which is a worm 178 on a shaft 179 which is mounted in a bearing connected to the table 70, a handle 180 connecting to the shaft at the front end for manual operation of the worm. A dial 179$^a$ properly graduated is secured to shaft 179 and indicates to the operator the amount of swing of the member 69 whereby the taper given to a piece of work may be determined as will be evident.

The tail stock of the machine is of special construction. The tail stock center 72 is seated in the end of a sleeve 182 slidably mounted lengthwise of the cylindrical part 183 of the tail stock support. In one end of sleeve 182 a block 184 interiorly bored and screw threaded is fixed into which a threaded part of a shaft 185 is inserted, said shaft extending beyond the end of part 183 and having an operating hand wheel 186 keyed or otherwise suitably fixed thereon. Integral with hand wheel 186 is a sleeve 187 rotatably mounted in a bearing 188 which closes the end of part 183. A sleeve 189 is placed around shaft 185 surrounding which is a coiled spring 190 interposed between an enlarged section or collar 191 on shaft 185 and a collar 192 threaded on to sleeve 189 and adjustable thereon to control the tension of the spring. Sleeve 189 is enlarged as shown at 193 at one end where it bears against the bearing 188. This construction has the effect of forcing the shaft 185, sleeve 182 and center 72 to the left (referring to Fig. 21) or until hand wheel 186 strikes against bearing 188. However by turning the handwheel the sleeve 182 and attached center may be drawn inwardly into the part 183 to permit the positioning of the work between centers and then operated in the opposite direction to engage with the work, while during the operation of grinding on the work and the development of heat causing the expansion of the work, such expansion is taken care of and compensated for by compression of spring 190 whereby the work may be ground truly and not irregularly as would be the case if no means was provided to care for such expansion. Furthermore the mechanism as a whole may be quickly operated for entering or taking work away from between centers, a lever 194 pivotally mounted between its ends having one end formed as a ball 195 and seated in a socket formed in a side of the sleeve 182 as shown in Fig. 21 whereby the sleeve may be moved lengthwise of the part 183 in which it is mounted for easy and ready movement of the center 72.

An upwardly projecting section 196 is cast integral with the part 183 heretofore described in which is adjustably mounted a rod 197 at its front end carrying a facing point or diamond 198 said rod being clamped in position by clamp 199 as shown in Fig. 22. By traversing the table far enough in front of the grinding wheel the diamond point is of utility in truing the grinding surface thereof, this being a matter of importance in grinding machines. The working of the grinding wheel is also further perfected by the novel mount for the shaft 23 on which it is fixed. The shaft is mounted within split taper bearings 200 located within taper sleeves 201 within borings in the ends of brackets 26 and 26. At spaced apart points in the length of the bearings 200 screws 202 are threaded into said bearings at the lengthwise slit therein. The screws are also tapered and as they are entered into the bearings the tendency is to widen the slit and as a bearing wears the wear may be taken up by adjusting the screws whereby a true mount of shaft 23 without faulty or vibratory movement thereof will be had. To further perfect the working of the machine, guard 36 is carried by a bar 204 adjustably mounted on a slide 205 whereby as the wheel wears away and diminishes in diameter the guard may be correspondingly adjusted to leave the proper open space at the front of the guard and to locate nozzle 37 in proper relation to the grinding wheel. Also to protect the slides 29 and 71 from water and grit thrown off from the wheel, guards 122ª and 206 are provided, the former being mounted in front of the table or carriage 28 and moved forward by it, returning to place on rearward movement of the carriage under the influence of springs 122. A still further feature of novelty resides in the construction of the headstock. Wheel 65 is loosely mounted upon a bushing 207 around sleeve 66 there being fastened to the wheel 65 a disk or like member 208 having a circular opening through which the head of a sleeve 208ª secured to sleeve 66 projects. Normally with the rotation of the wheel 65 sleeve 66 and attached parts remain at rest, the center 67 not rotating but being in the condition known as a "dead" center. A pin 209 is threaded through the disk 208 as shown and may be entered into an opening 210 in the sleeve 208ª serving to connect wheel 65 to the sleeve 66 whereby the center 67 rotates with the rotation of the wheel as a "live" center. As usual in a construction of this character the work is secured to a member 211 carried on the face of disk 208 whereby it always turns with the rotation of the wheel 65.

A grinding machine of the construction set forth combines many features of novelty and utility. The single master gearing in combination with the two change speed gearings and the controls therefor make it possible to drive the work and the table at a great number of different speeds and to stop either one or both practically instantly. The cross feed for the grinding wheel and the manual and automatic control therefor is especially a novel and useful feature of my invention. The positioning of the various controls in restricted space and centralized as described make the machine one of especial value with respect to ease and accessibility of the operator to the controlling devices, and the adjustment for taper work is one very simple and easily operated. The features together with the many others outlined make a machine which in practice make it possible to work to within limits of one ten thousandths of an inch which is practically the most minute degree of accuracy of which machines operated through human agency are capable. The mechanism is comparatively simple and not liable to get out of order. Many changes in minor detail of construction may be resorted to without departing from the invention and, accordingly I consider myself as entitled to all modifications in construction falling within the scope of the appended claims which define the invention and not limited to the exact specific structure shown.

I claim:

1. In a grinding machine, a support, a work holding table mounted to traverse lengthwise of the support, means to rotatably mount a cylinder on the table, means for moving the table, a master gearing for driving both the table in its movements and the cylinder in its rotation, and control mechanism for connecting said master gearing with the driving means for said table and cylinder, said control mechanism being operable for each independent one of the other.

2. In a grinding machine, a master gearing including a plurality of gears progressively increasing in size, two series of gears engaging one above and the other below with the master gears, shafts on which said series of gears are loosely mounted, means for connecting any one of said series of gears with its respective shaft, a table mounted for reciprocation, means operated by one of said shafts for effecting the movement of the table, work holding mechanism carried by the table, means driven by the other of said shafts for operating the work holding mechanism, and means for driving the master gearing.

3. In a grinding machine, a slidably mounted table, a master gearing, a shaft to which the master gearing is secured, means to drive the shaft, a work holding means mounted on the table, and separate means driven each by the master gearing for rotating the work holding means and for reciprocating the table.

4. In a grinding machine, a support, a table mounted thereon, a member positioned lengthwise of the table and pivotally connected thereto between its ends, a segment of a worm gearing connected to said member, at one end thereof, a worm mounted on the table engaging with said segment, and means for manually turning the worm.

5. In a grinding machine, a support, a drive shaft mounted at the back of the support, a shaft located at the front and at one end of the support, means to drive said second shaft from the drive shaft, a series of gears of different sizes on said second shaft, a third shaft located at the front of and at the opposite end of the support, a series of change speed gears for operating said last named shaft engaging with the first gears, a bracket projecting from the support carrying one end of the last named shaft, an elongated roller rotatably mounted on said bracket and the support back of said last named shaft, means to drive the roller from the shaft, a table mounted for lengthwise movements on the support, a head stock including a rotatable spindle mounted on the table, and means to drive said spindle from the roller during the movements of the table.

6. In a grinding machine, including a reciprocating table, work holding devices mounted on the table including a rotatable shaft on one of said devices for rotating the work, means to drive said shaft during the movements of the table including a main drive shaft, a series of gears of different sizes driven by the main drive shaft, a series of loosely mounted gears meshing with the first gears, and means to connect any one of said loosely mounted gears with the immediate driving mechanism for the first mentioned shaft, substantially as described.

7. In a grinding machine, a support, a shaft mounted thereon, a second shaft in alinement therewith, clutch mechanism for connecting and disconnecting said shafts, a series of gears of varying sizes on the second shaft, a pair of shafts mounted parallel to and on opposite sides of the said second shaft, a series of gears loosely mounted on each of said pair of shafts, means to connect any one of said series of loose gears to its respective shaft, a table movably mounted on the support, means operated by one of said pair of shafts for moving the table back and forth on the support, work holding devices mounted on the table one of said devices including a rotatably mounted shaft for turning the work, and means for rotating said last mentioned shaft from the other of said pair of shafts.

8. In a grinding machine, mechanism for operating the work holding table and the work holding devices on the table including a shaft, a series of gears of different sizes on the shaft, a shaft in alinement with the first shaft, a clutch for engaging and disengaging said shafts, a pair of shafts one at either side of the first shafts and parallel thereto, a series of gears loosely mounted on each of said pair of shafts meshing with the first mentioned gears, means to connect a gear of the first mentioned gearing to either of said pair of shafts to drive the same, and operating mechanism for effecting the control of the clutch and of the gearing connections located at the front of the machine, the devices for operating the clutch and the two series of gearings being located one over the other, substantially as described.

9. In a grinding machine, a support, a carriage mounted for movements transversely of the support, a grinding wheel mounted on the carriage, a bracket depending from the carriage, a shaft having a threaded end screwed into the lower end of the bracket, a second shaft parallel to the first shaft, a sleeve loose on the last mentioned shaft, said sleeve and shaft having their front ends extending in front of the support, a hand wheel connected to the front end of the sleeve, and means for rotating the first mentioned shaft on rotation of the sleeve.

10. A grinding machine having a table for the work in combination with a grinding wheel, means for reciprocating the table in front of the wheel including a reversing lever pivotally mounted between its ends at the front of the machine, said lever being tilted at the end of each reciprocation of the table, an extension to the lever below its point of pivotal mounting, a bar pivotally mounted at one end and lying directly below said extension, screws threaded through the bar toward said extension, a spring operated plug carried by the free end of the bar, a second bar pivotally mounted above the first bar, a lever pivotally mounted on said second bar and engaged by the plug, a pawl at the upper end of the lever, means to adjust the free end of the first bar in a vertical direction, a rotatably mounted sleeve, a notched wheel keyed to the forward end of the sleeve with which said pawl engages, and means operated by the rotation of the sleeve for moving the grinding wheel transversely of the machine toward or away from the work.

11. A grinding machine having a table for work in combination with a grinding wheel, means for driving the wheel, means for reciprocating the table in front of the work including a reversing lever pivotally mounted between its ends at the front of the machine, said lever being tilted by the table at the end of each reciprocatory movement thereof, a shaft rotatably mounted transversely of the machine, a hand wheel secured at the forward end of the shaft, means interposed between the shaft and table whereby the table may be moved manually by turning the hand wheel and rotating the shaft, a sleeve loosely mounted around the shaft, means operated by the rotation of the sleeve for moving the grinding wheel transversely of the machine toward or away from the work, a sleeve rotatably mounted around the first sleeve to which the reversing lever is attached, a hand wheel keyed to said first sleeve for manually rotating the sleeve, a notched wheel also keyed to the first sleeve, a lever carrying a pawl engaged with said notched wheel, and means for operating said lever through movements of the reversing lever to rotate said first sleeve a limited distance in one direction to move the grinding wheel toward the work, substantially as described.

12. A grinding wheel having a table for carrying the work in combination with a grinding wheel, means for driving the wheel, means for reciprocating the table in front of the work including a reversing lever pivotally mounted between its ends at the front of the machine, an elongated sleeve rotatably mounted transversely of the machine, means interposed between the sleeve and grinding wheel whereby rotation of the sleeve will move the wheel transversely of the machine toward or away from the work, a notched wheel keyed to the front end of the sleeve, a lever carrying a pawl engaged with the notched wheel means operated by the movements of the reversing lever for actuating said pawl on the notched wheel to turn it a limited distance in one direction, a member loosely mounted on said notched wheel and having a shroud extending over one portion of the wheel, means to fix said member to the notched wheel to move therewith, and an extension to the shroud curved to lie closely adjacent the notched wheel, said extension projecting toward the pawl.

13. In a grinding machine, a work holding table mounted for reciprocatory movements, means for reversing the movement of the table including a reversing lever, a bar secured at the front of the table adjacent the lever, a pair of members positioned in spaced apart relation on the bar, means for adjustably securing the members on the bar, a screw threaded through each member the ends of the screws on the members extending toward each other, and means to lock said screws on said members in any position to which they may be adjusted the ends of said screws engaging with and operating the reverse lever as the table moves back and forth, substantially as described.

In testimony whereof I have affixed my signature.

HARRY J. PERKINS.